Dec. 27, 1932.          R. I. MARKEY          1,892,065
AEROPLANE ENGINE MOUNT
Filed Dec. 10, 1931    2 Sheets-Sheet 1
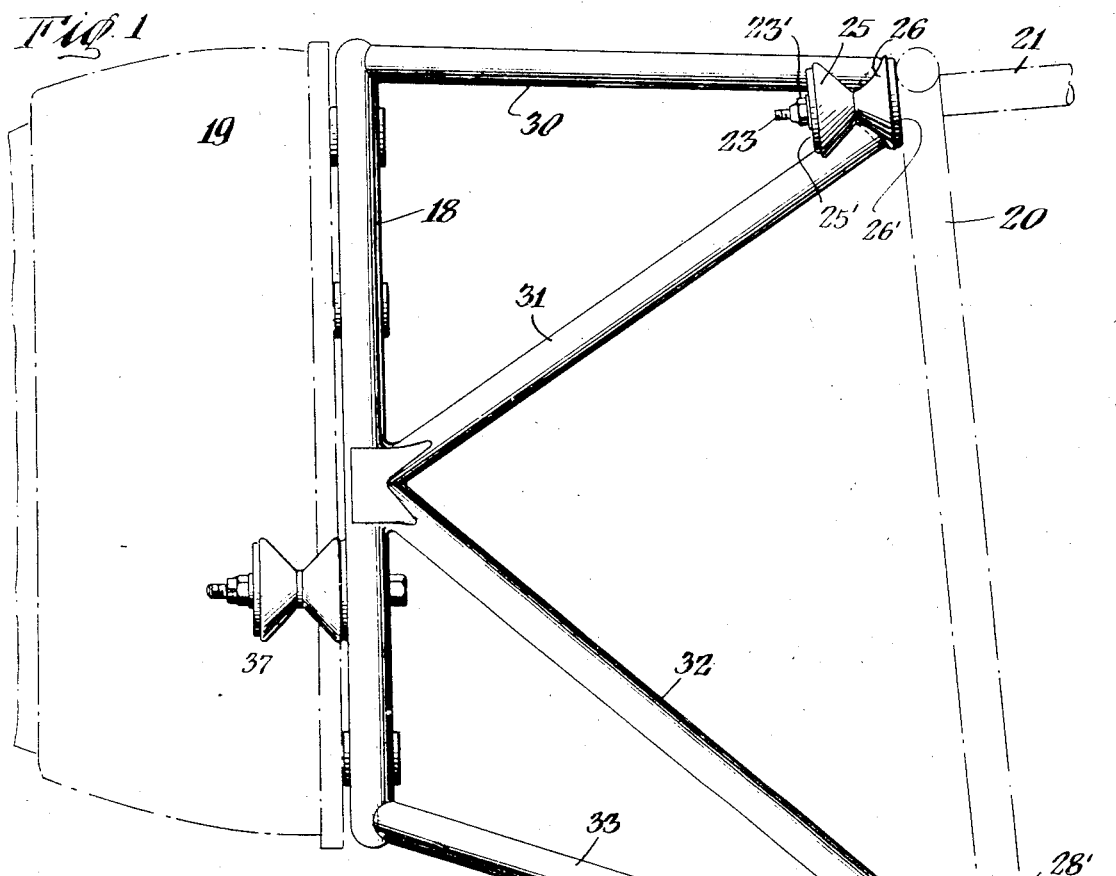
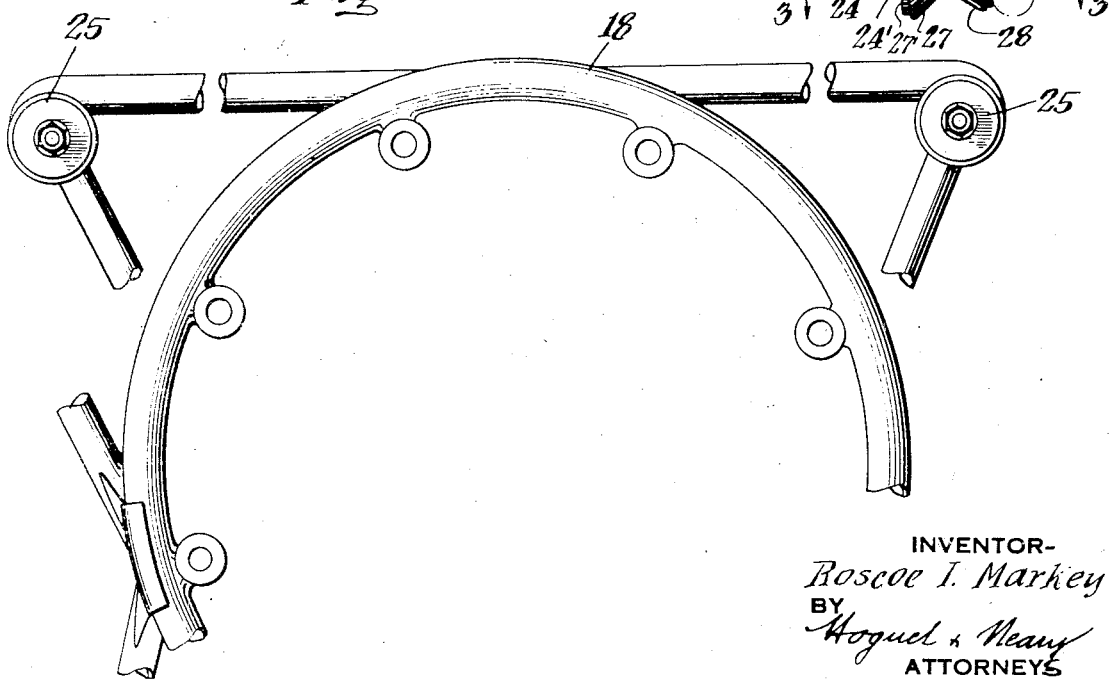
INVENTOR-
Roscoe I. Markey
BY
Hoguet & Neary
ATTORNEYS

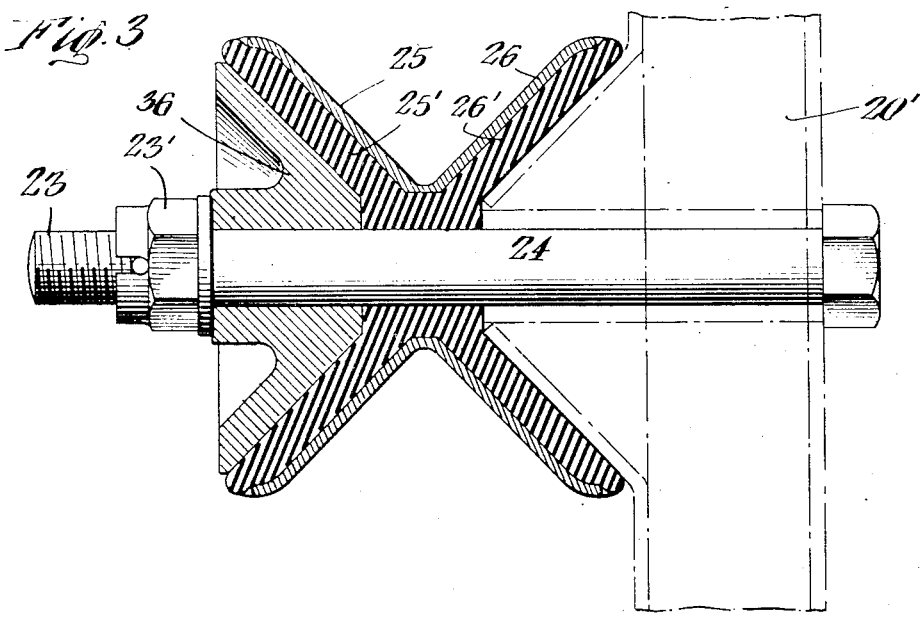
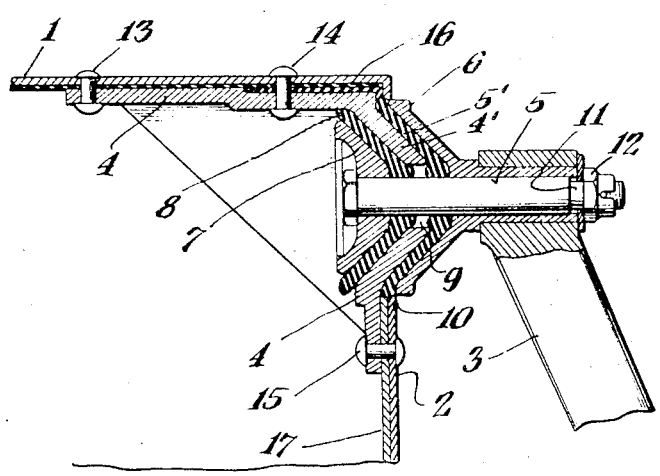
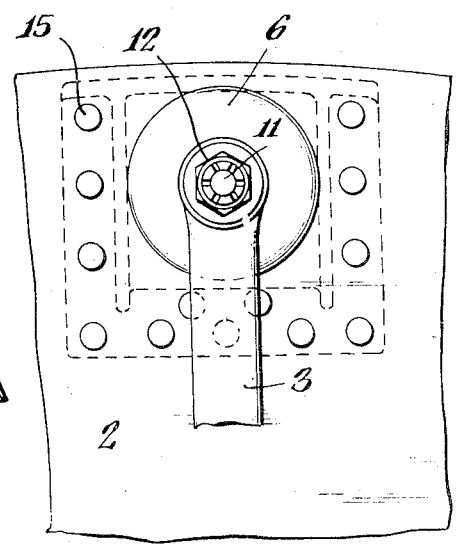
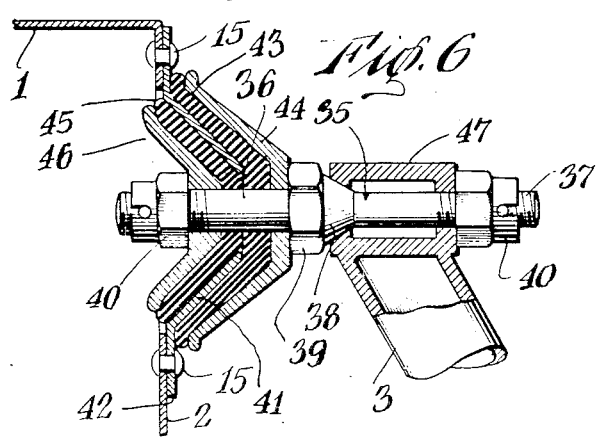
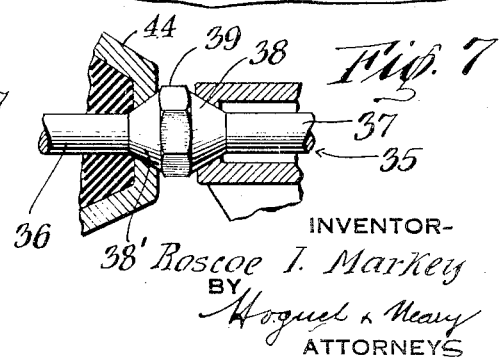

Patented Dec. 27, 1932

1,892,065

UNITED STATES PATENT OFFICE

ROSCOE I. MARKEY, OF FARMINGDALE, NEW YORK, ASSIGNOR TO THE AVIATION PATENT AND RESEARCH CORPORATION, OF NEW YORK, N. Y., A CORPORATION OF NEW YORK

AEROPLANE ENGINE MOUNT

Application filed December 10, 1931. Serial No. 580,021.

This invention relates in general to mountings for power units, and more particularly to mountings for engines in aeroplane fuselages.

The object of the invention is to provide particularly for a suitable mounting for an engine in an aeroplane fuselage of the metal tube, monocoque, or other type.

It is a further object to provide such a mounting with suitable means for absorbing and dampening of the vibrations set up by the operation of the motor.

It is well known in the art that certain cushioning members have been provided ostensibly for this purpose but in no instance has there been provided in a metal tube fuselage an engine mount which in the latter's connection to the engine and to the fuselage has been cushioned by shock absorbing means to the complete elimination of metallic contact between the engine and its mount and between the mount and the fuselage carrying it.

It is therefore the prime object of this invention to provide cushioning devices between the engine and its mount and between the mount and the fuselage carrying it, to the complete elimination of any metallic contact between these members, and still retain the requisite rigidity and stability in the assembly.

With the foregoing and other objects in view, the invention consists in the combination of parts and in the details of construction hereinafter set forth in the following specification and appended claims, certain embodiments thereof being illustrated in the accompanying drawings, in which:

Figure 1 is a view in side elevation of the fuselage tubing, an engine ring mount, an engine carried thereby and the supporting tubes extending between the ring and the fuselage.

Figure 2 is a partial front elevation of the engine ring mount and support.

Figure 3 is a detail view in section of one form of cushioning member.

Figure 4 is a detail view in section of another form of cushioning member.

Figure 5 is a detail view in elevation of that shown in Figure 4.

Figure 6 is a view similar to Figure 4 with a slight modification thereof.

Figure 7 is a view in section of a portion of that shown in Figure 6, modified slightly.

Referring more particularly to the drawings, Figure 4 shows one member 3 of an engine mount attached to the main structure or body through a vibration absorbing unit. This unit consists of two resilient cones or pads 8 and 5', which are arranged alternately between three cones 7, 4' and 6 of some structural material, such as wood, metal, or the like. Two of the structural cones 7 and 6 travel with the mount 3, while the third, 4', rests with the aeroplane structure to which it is attached, such as the fuselage or the wing. This unit absorbs vibration by means of internal friction in the resilient pads 8 and 5', so as to dampen the vibration by changing the frequency and amplitude of the engine frequency and the amplitude of vibration of the engine mount and body unit by preventing them from vibrating at the same frequency. The cushion pads 8 and 5' may be made of rubber, fabric impregnated with rubber, wood, fibre, leather, paper, or similar material.

Cone 4' is a part of the bracket 4 which is riveted to the body structure at 13, 14 and 15. In a monocoque body the skin or shell would be indicated at 1, while 2 represents the fire wall or end bulkhead, and in connection with this is shown a bulkhead and skin reenforcement 17 and 16 which may or may not be required. The clearance 9 is arranged for between the bolt 11 and cone 4' on the structural bracket so as to prevent metal contact and to allow the rubber cones 5' and 8 to have a tendency to fill the gap thus provided for under the inward pressure of cone 6 against the rubber cone 5' and the outward pressure of cone 7 against the rubber cone 8. A clearance 10 is also provided for between the cone 6 and the rigid structures 1 and 2. Both clearances 9 and 10 may be filled with the cushion pad when the same is made of rubber, or like material, which will tend to flow under pressure. The hollow stub 5 projects through the cone 6 and serves as a support for the socket on the end of the engine mount member 3. The connection between member 3 and the engine mount may be effected by means of a nut 12 on the bolt 11, which extends through the hollow stub 5 and serves as a means for applying the necessary pressure on the pads 8 and 5' and to hold the mount 3 on to the cushion pads.

As shown in Figure 6, this construction may be modified so as to arrange for flexibility of adjustment and for more perfect alignment. In this instance it may be found desirable to replace the hollow stub 5 with a bolt 35 extending through the extremity of member 3, the bolt 35 being provided with a bevelled enlargement fitting in a corresponding socket in the end of member 3. The bolt may further have a nut on each end 40 and an adjustment nut 39 intermediately arranged adjacent the conical enlargement. In this manner one nut adjusts the compression on the cushion pads which may be properly adjusted and left alone, while the other nut may be removed to permit the removal of the mount and the quick changing of the engine. Instead of having merely one conical enlargement, it may be desirable to provide the bolt with opposite conical enlargements, such as shown in Figure 7 at 38 and 38', the extremity of the engine supporting member 3 and the rigid cone 44 being provided with corresponding conical seats to receive the conical enlargements on the bolt 35. In all of the modifications shown in Figures 4, 5, 6 and 7, there is no direct or indirect contact between the members 1 and 2 and member 3, the cushioning pads being so positioned as to effectively dampen the vibrations as above explained.

In the modification shown in Figure 1, the engine ring mount 18 is adapted to have the engine 19 connected to and supported thereby. The tubular or other type of fuselage is represented by the front tubes or other members 20 and the longérons 21 and 22. The longérons 21 and 22 have connected thereto bolts 23 and 24 and are provided with a pair of opposed metal cones 25 and 26 provided with resilient shock absorbing material 25', 26' and metal cones 27, 28 provided with shock absorbing material 27' and 28' and retained by means of nuts 23' and 24'. The cones may be welded together in the position shown in Figure 1. Extending between the engine ring mount and the fuselage tubular members are a plurality of tubular bracing members, four of which are shown in Figure 1. The tubular braces 30 and 31 extend towards the fuselage at such an angle as to be substantially tangentially to the inclined surface of the metal cone 25 and rest against and be welded to the inclined surface of the metal cone 26, the rubber elements 25' and 26' serving to effectively dampen out any vibrations which might otherwise be transmitted from the ring mount to the fuselage. The identical relation exists between the tubular bracing members 32 and 33 with respect to the metal cones 27 and 28 and their rubber elements 27' and 28'. The type of shock absorbing element here shown may be substituted for that and described in Figure 4. Figure 3 is a detail showing of the cones shown in Figure 1, the cones 25 and 26 being metallic and welded together and provided with rubber elements 25' and 26' and held in position by a conical clamping device 36 screwed on the bolt 24 to provide for a dampening effect of vibrations which would otherwise be transmitted from the bracing tubes to the fuselage tubes. The rubber elements 25' and 26' contact with the bolt 24 and prevent any metal contact between the member 36, the bolt 24 and the member 20'. Cones of the same construction are employed throughout all of the various connections between the engine and the ring mount 18 as indicated at 37 to represent one of such connections.

In certain cases it may be found desirable to employ the connection device of Figure 3 between the engine and ring mount alone or between the ring mount support and the fuselage alone or in both places. The same is true of the connection device of Figure 4. It also may be found desirable to employ one embodiment at one place and the other at the other place. In this connection 20' may, for purposes of description, represent broadly a fuselage member or a part of the engine frame.

I claim:

1. An engine mounting for vehicle engines comprising a mounting ring, conically shaped seats carried by said ring, contiguous blocks of yielding non-metallic material mounted in said seats, conical bearing members carried by the engine and disposed concentrically to the first seats, and adjustable means for maintaining the bearing members in position with the yielding means under compression.

2. An engine mounting for vehicle engines comprising a mounting ring, conically shaped seats carried by said ring, contiguous blocks of yielding non-metallic material mounted in said seats, conical bearing members carried by the engine and disposed concentrically to the first seats, and adjustable means for maintaining the bearing members in position with the yielding means under compression, said means comprising a bolt carried by said ring and a conical tightening nut adjustably carried by said bolt, said bolt and nut being cushioned by said members from metallic contact with said ring and being otherwise freely movable in all directions with respect thereto.

3. An engine mounting for vehicle engines comprising a mounting ring, a plurality of cones providing conically shaped seats, contiguous blocks of yielding non-metallic material mounted in the seats, connecting means between said ring and said engine comprising a connecting bolt carried by said ring passing through said blocks, a conical nut adjustably carried by said bolt, said bolt and nut being cushioned by said members from metallic contact with said ring and being otherwise freely movable in all directions with respect thereto.

In testimony whereof, I have signed my name to this specification this 13th day of November, 1931.

ROSCOE I. MARKEY.